US009305271B2

(12) United States Patent
Bögl et al.

(10) Patent No.: US 9,305,271 B2
(45) Date of Patent: Apr. 5, 2016

(54) METHOD AND AN APPARATUS FOR AUTOMATICALLY PROVIDING A COMMON MODELLING PATTERN

(75) Inventors: Andreas Bögl, Tragwein (AT); Gustav Pomberger, Linz (AT); Michael Schrefl, Altenberg (AT); Norbert Weber, Glonn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1126 days.

(21) Appl. No.: 12/654,347

(22) Filed: Dec. 17, 2009

(65) Prior Publication Data

US 2011/0153311 A1 Jun. 23, 2011

(51) Int. Cl.
*G06Q 10/06* (2012.01)
*G06F 17/50* (2006.01)

(52) U.S. Cl.
CPC ...................................... *G06Q 10/06* (2013.01)

(58) Field of Classification Search
CPC ......... G06F 8/35; G06F 8/34; G06F 17/5054; G06F 11/3604
USPC .................. 717/104; 703/1–22; 707/790–812
See application file for complete search history.

(56) References Cited

U.S. PATENT DOCUMENTS

| | | | |
|---|---|---|---|
| 5,394,322 A * | 2/1995 | Hansen | 700/37 |
| 5,761,674 A * | 6/1998 | Ito | |
| 6,564,210 B1 * | 5/2003 | Korda et al. | |
| 6,901,579 B1 * | 5/2005 | Suguta | 717/108 |
| 7,467,145 B1 * | 12/2008 | Castellanos et al. | |
| 8,131,756 B2 * | 3/2012 | Carus et al. | 707/776 |
| 2003/0028396 A1 * | 2/2003 | Balasubramanian et al. | 705/1 |
| 2004/0154000 A1 * | 8/2004 | Kasravi et al. | 717/130 |
| 2005/0038764 A1 * | 2/2005 | Minsky | G06Q 10/06 706/47 |
| 2005/0144150 A1 * | 6/2005 | Ramamurthy et al. | 706/45 |
| 2007/0245294 A1 * | 10/2007 | Saito et al. | 717/100 |
| 2008/0184231 A1 * | 7/2008 | Dreiling | 718/100 |
| 2009/0105855 A1 * | 4/2009 | Mehta et al. | 700/89 |
| 2010/0004923 A1 * | 1/2010 | Bogl et al. | 704/9 |
| 2010/0114629 A1 * | 5/2010 | Adler | G06Q 10/00 705/7.36 |
| 2010/0293451 A1 * | 11/2010 | Carus | 715/230 |

OTHER PUBLICATIONS

Jan Mendling and Carlo Simon. Business process design by view integration. In Business Process Management Workshops, pp. 55-64, 2006; Others.

(Continued)

*Primary Examiner* — Chat Do
*Assistant Examiner* — Sergio J Curbelo, III
(74) *Attorney, Agent, or Firm* — Harness, Dickey & Pierce, P.L.C.

(57) ABSTRACT

At least one embodiment of the present invention is directed to a method and/or an apparatus for automatically providing a common modelling pattern as a function of a plurality of stored process models. The common modelling patterns are identified according to three substeps, namely semantic annotation, extraction of pattern based description and composite process pattern mining. The detected common modelling patterns serve as best practice candidates as regards process engineering. At least one embodiment of the present invention finds application in a variety of domains being related to process management, such as process design, process mining and semantic process planning.

18 Claims, 7 Drawing Sheets

(56) References Cited

OTHER PUBLICATIONS

W. M. P. van der Aalst, B. F. van Dongena, J. Herbst, L. Marustera, G. Schimm, and A. J. M. M. Weijters. Workflow mining: A survey of issues and approaches. Data & Knowledge Engineering, 47:237-267, 2003; Others.

Bernd Heinrich, Marc-Andre Bewernik, Matthias Henneberger, Alexander Krammer, and Florian Lautenbacher. Sempa ein ansatz des semantischen prozessmanagements zur planung von prozessmodellen. Wirtschaftsinformatik, 50(6):445-460, Dec. 2008; Others.

\* cited by examiner

METHOD AND AN APPARATUS FOR AUTOMATICALLY PROVIDING A COMMON MODELLING PATTERN

FIELD

At least one embodiment of the invention generally relates to a method and/or an apparatus for identifying similar patterns in a plurality of process models and especially to a method and an apparatus for automatically providing a common modelling pattern from a plurality of stored process models. At least one embodiment of the invention furthermore relates to a computer program being adapted to perform at least one embodiment of the method on a computer as well as a data carrier which stores the computer program.

BACKGROUND

There exists a variety of processes, such as work processes in organization or manufacturing processes for manufacturing or assembling devices. Processes can be described by using process models. Processes are modeled using different kinds of process modelling languages. An example for a process modelling language is the unified model language (UML). Processes can also be described by event-driven process chains (EPC).

One of the most popular process modelling language denotes the Event-driven Process Chain (EPC) modelling language. It has gained a broad acceptance and popularity both in research and in practice. An EPC Model is a directed and connected graph whose nodes are events, functions and logical connectors which are connected by control flow arcs. Functions represent the time consuming elements by performing tasks on process objects (e.g. the task "Define" is performed on the Process Object "Software Requirements"). Each function has exactly one ingoing and one outgoing arc. Further, a function transforms a process object from an initial state into a resulting state captured by events that represent the passive elements. The state information is also bound to a text phrase (e.g. "Requirements Defined"). Each event has at most one ingoing and at most one outgoing arc. A connector can be either an AND-, an OR-, or an XOR-connector. A connector has multiple ingoing arcs and one outgoing arc (join), or it has one ingoing arc and multiple outgoing arcs (a split).

In organizations processes are described by comprehensive process designs. A business process is a set of coordinated activities, conducted by technical resources, with the objective to achieve a specific goal. Process designs are represented as process models in a particular modelling language, usually depicted by a graph of activities and their causal dependencies.

Besides a documentation of existing processes, the design of process models may have several, additional motivations that can be classified into motivations that accomplish the organizational design or the development of information technology systems. Process descriptions support process design by enabling the identification of flaws in existing processes, by optimizing and by monitoring existing processes. Concerning the design of an IT-Infrastructure, process models play an important role for the specification and configuration of software systems. Another important role denotes the usage for workflow management systems wherein process models specify executable workflows.

Hence, process models are input for semantic analysis activities that address organizational or information technology aspects. Semantic analysis activities comprise the comparison of process models, the calculation of process model metrics, the extraction of a common sense process vocabulary and queries on process models.

The comparison of process models is a semantic analysis activity which addresses the identification of similar or equal process activities in process descriptions. Model comparisons can be used to specify a metric that defines a similarity measure between reference processes and organizational specific processes, for example. Reference processes describe common or best practice process solutions. Further, the comparison of process models enables to identify structural analogies in process models that may be an indicator for process patterns.

The calculation of process model metrics is performed to calculate model metrics which can be used to determine a process model quality by calculating a measure that determines the complexity. The model complexity can be defined by a number of logical connectors, a number of different activities, relationships between input and output objects, or a number of different roles associated with process activities.

In large organizations, the design of process models is realized by a number of process modelers. This implies a certain subjectivism concerning the naming of activities and information objects by using synonyms, not standardized abbreviations, for example.

Current approaches mainly provide a document-based representation of process patterns, meaning that an effective use is difficult. An informal representation is suitable to understand the rationale behind a pattern but does not allow any automation concerning the finding and selecting of appropriate patterns or applying them. For that reason, an informal description can be enriched with a formal representation of used vocabulary by following an ontology-based approach. This combination makes process patterns understandable for both, stakeholders and machines.

A formalized pattern description facilitates an automated retrieval of common practice solutions for achieving desired business goals and to develop tools for intelligent reasoning over process patterns. A problem solved by a process pattern can be interpreted in the sense of how to achieve a defined process goal. Usually, the identification and design of process models is derived from the goals or objectives of an enterprise, because the processes are a means to achieve the goals. However, when using the EPC modelling language for process description, process goals are not explicitly modelled in practice. Hence, process goals must be extracted retroactively from given EPC models. Further, process goals are not isolated items within a goal space. In general, goals are organized in terms of a taxonomy which decomposes goals into a set of subgoals each has assigned at least one pattern solution.

Hence, commonly known methods are not able to provide a proven pattern solution, also referred to as common modelling pattern, to achieve a business goal. Common modelling patterns may be considered as candidates for a best practice solution for achieving a certain goal. Identifying a best practice solution without an automated provision of common modelling patterns requires an evaluation by process experts, which is of great effort and may deliver unreliable results.

SUMMARY

An embodiment of the present invention provides a method and/or an apparatus for automatically providing a common modelling pattern, which may for instance serve as a best practice solution candidate.

Therefore a method for automatically providing a common modelling pattern from a plurality of stored process models is introduced. In at least one embodiment, the method comprises:

In a first step establishing at least one linkage between at least one process element of the plurality of process models and at least one reference model element of a stored reference model is performed.

In a second step extracting a plurality of elementary process patterns comprising at least a process goal associated with a process solution from the plurality of process models and constructing a process goal tree which organizes dependencies between process goals of elementary process patterns is performed.

In a final step detecting at least one elementary process pattern being comprised in at least a predetermined number of process models for providing the common modelling pattern is performed. Thereafter, an analysis of the goal tree and its associated elementary process patterns may be performed with the aim to detect composite process patterns, i.e., common modelling practices.

A common modelling pattern may not be confused with abstracted, composite process patterns. There are several similarities but also significant differences. An abstracted, composite process pattern provides a universally valid process solution for domain-specific process models, respectively specializations of an abstracted process pattern. Consequently, each element of an abstracted, composite process pattern must be a part of a specialized process pattern. Further, initial and final state of abstracted and specialized process solutions must correlate. An initial state (precondition) of a process pattern indicates a process goal that must be satisfied in order to execute that process pattern; a final state represents the process goal being achieved by that process pattern.

The main building criterion for common modelling pattern may rely on heuristic approaches. Similar process solutions that achieve similar process goals and this number of solutions exceeds a predefined threshold value (e.g. frequency of two), and then it is a potential candidate for a common modelling pattern structure. Based on these preliminary considerations, common modelling pattern structures can also be identified in domain-specific models where no abstracted, composite process pattern can be extracted from.

A process pattern comprises at least one activity used as solution to satisfy a process goal. A process goal may for instance be defined as a certain state for a process element.

Each process model comprises at least one process element according to the applied meta model of the process model. Furthermore a reference model is provided, which may for instance be stored in a storage device. The reference model may for instance be an ontology, which models process specific facts. By comparing the process elements and the elements of the reference model one may identify common elements, which occur in the process model as well as in the reference model. A process model according to which an assembling machine is controlled by an event "product assembled". The reference model may provide for instance, one reference model element "product assembled". Hence the process element and the reference model element can be linked together. Establishing links between the process models and the at least one reference model can also be referred to as "semantic annotation". Hence each of the process elements is assigned further semantic information from the provided reference model.

Considering the semantic annotation and the established linkage respectively, one can derive process goals from the plurality of process models. Extracting the plurality of process goals may furthermore comprise an arrangement of the extracted process goals, in terms of a goal tree. Hence a process goal tree is provided as a function of the established at least one linkage. For each process model of the plurality of stored process models one process goal tree can be provided.

In a further step identifying at least one process goal having assigned at least one pattern solution being comprised in at least a predetermined number of process models is performed. This can be accomplished by comparing each of the provided process goal trees. Frequently occurring process goals can hence be extracted from the plurality of process goal trees. As each of the process goals is comprised in at least one process model each process goal can be considered as a candidate for a process element of the common modelling pattern. Those process goals occurring at a predetermined number of process models are included in the common modelling pattern. The predetermined number forms a threshold, which indicates above which number an extracted process goal can be considered as being "common" and is therefore included in the common modelling pattern. Hence only frequently occurring process goals, each having assigned at least one pattern solution to form elementary process patterns, which occur in a variety of process models form the common modelling pattern. Thus, the common modelling pattern may comprise several process patterns and may furthermore comprise process goal trees.

In an embodiment of the present invention the stored reference model is formed by at least an ontology comprising a lexical knowledge base and a process knowledge base, each expressed by formal or semi-formal models.

This provides the advantage that the reference model may be represented according to a variety of representation formats. This furthermore provides the advantage that existing reference models can be re-used.

In yet a further embodiment of the present invention each process model is represented by at least one of a group of representations, the group comprising: a graph based or graphical representation or text based representation. Particular representations are a xml based representation, an EPC based representation, a BPMN based representation, a UML based representation or a Petri-net based representation.

This has the advantage that the process model can be represented according to a variety of representation formats. This furthermore provides the advantage, that existing process models can be re-used.

In yet a further embodiment of the present invention each process model comprises a plurality of process goals.

This has the advantage that also process models achieving a variety of alternative process goals can be processed according to the suggested method.

In yet a further embodiment of the present invention each process goal is formed by at least one of a group of concepts, the group comprising: an identifier, a process element of at least one of the plurality of process models, a state of the process element and a constraint indicating a precondition with reference to the process element.

This has the advantage that several concepts of a meta model can be considered as a process goal.

In yet a further embodiment of the present invention the process elements are labeled by text phrases each comprising at least one term.

This provides the advantage that process elements of existing process models can be re-used, as they typically are labeled by text phrases and terms.

In yet a further embodiment of the present invention the terms are classified according to a natural language grammar into different word types comprising nouns, verbs, articles, conjunctions, prepositions and adjectives.

This has the advantage that for instances the linkage between the process elements and the reference model elements can be accomplished as a function of different word types.

In yet a further embodiment of the present invention stop words of predetermined stop word types are filtered from the terms. This has the advantage that the establishing of the linkage can be performed more precisely.

In yet a further embodiment of the present invention the stop word types comprise prepositions, articles and conjunctions.

This has the advantage that stop words can be identified more easily.

In yet a further embodiment of the present invention, establishing the at least one linkage comprises performing a linguistic analysis of the process elements and the reference model elements.

This holds the advantage that sophisticated linguistic analysis approaches can be applied in the suggested methods. This furthermore holds the advantage that the semi-formal character of process models is respected.

In yet a further embodiment of the present invention extracting at least one elementary process pattern comprises an analysis of the reference model.

This holds the advantage that the reference model, which may be formed by a reference ontology, may be processed according to sophisticated ontology engineering approaches and/or reasoning algorithms.

In yet a further embodiment of the present invention the reference model provides a hint for extracting at least one process goal. This has the advantage that the process goals can be extracted easily and precisely.

At least one embodiment of the present invention is also directed to an apparatus for automatic provision of a common modelling pattern from a plurality of stored process models. The apparatus comprises:
  a first means for establishing at least one linkage between at least one process element of the plurality of process models and at least one reference model element of a reference model being stored in a storage device;
  a second means for extracting a plurality of elementary process patterns comprising at least a process goal associated with a process solution from the plurality of process models and constructing a process goal tree which organizes dependencies between process goals of elementary process patterns; and
  a third means for detecting at least one elementary process pattern being comprised in at least a predetermined number of process models for provision of the common modelling pattern. Optionally, the apparatus comprises a fourth means for analyzing the goal tree and its associated elementary process patterns, with the aim to detect composite process patterns, i.e., common modelling practices.

At least one embodiment of the invention furthermore provides a computer program being adapted to perform at least one of the afore-mentioned methods.

At least one embodiment of the invention furthermore provides a data carrier which stores a computer program as mentioned above.

BRIEF DESCRIPTION OF THE FIGURES

In the following possible embodiments of the method and the apparatus for automatically providing a common modelling pattern from a plurality of stored process models are described with reference to the enclosed figures.

In the following same aspects are denoted with the same reference signs if not indicated otherwise.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1:
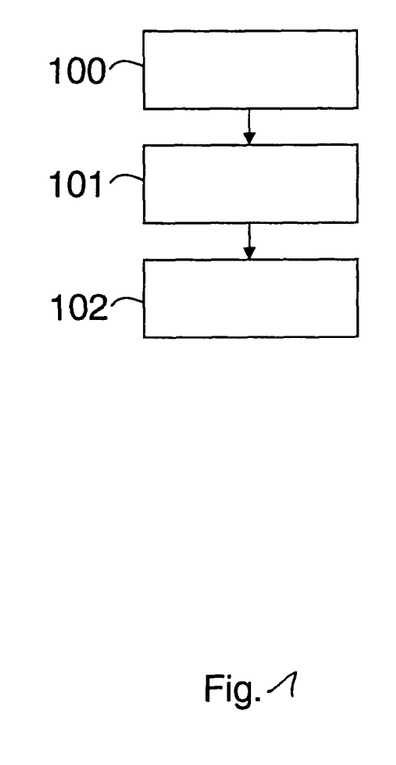
FIG. 1 shows a flow diagram of a method for automatically providing a common modelling pattern according to an aspect of an embodiment of the present invention.

FIG. 1 shows a flow diagram of a method for automatically providing common modelling pattern from a plurality of stored process models. The method comprises the following steps:

In a first step 100 establishing at least one linkage between at least one process element of the plurality of process models and at least one reference model element of a stored reference model is performed.

In a subsequent step 101 extracting a plurality of elementary process patterns comprising at least a process goal associated with a process solution from the plurality of process models and constructing a process goal tree which organizes dependencies between process goals of elementary process patterns is performed.

In a final step 102 detecting at least one elementary process pattern being comprised in at least a predetermined number of process models for providing the common modelling pattern is performed. Thereafter, an analysis of the goal tree and its associated elementary process patterns may be performed with the aim to detect composite process patterns, i.e., common modelling practices.

Figure 2:
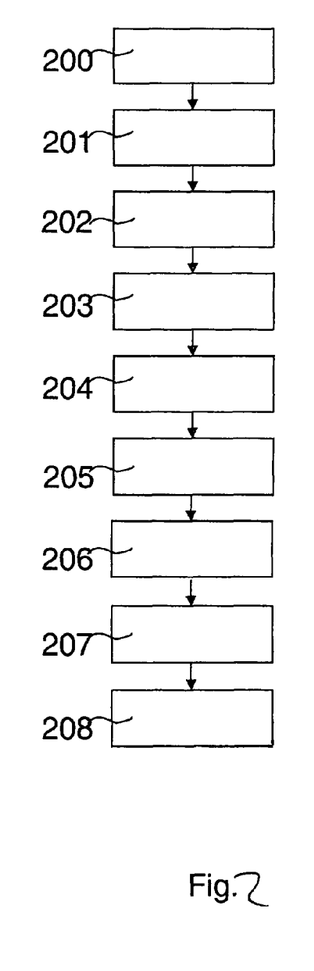
FIG. 2 shows a detailed flow diagram of a method for automatically providing a common modelling pattern according to an aspect of an embodiment of the present invention.

FIG. 2 shows a detailed flow diagram of a method for automatically providing a common modelling pattern and comprises the following steps:

In a first step 200 a plurality of stored process models is provided. The provision of process models in step 200 may for instance be performed by a lookup in a database storing that process models. The database may comprise a model repository which provides the process models along with further meta formation regarding the process models. The provision of process models can furthermore comprise several substeps, such as the generation of at least one of the process models. The process models may for instance be automatically provided by logging user behaviour. The process models may be represented in an xml based format. Hence the provision of the process models may also comprise parsing of data files storing the process models.

In a subsequent step 201 at least one reference model is provided. Analogue to the provision of the process model in step 200 the reference model may be comprised in a further repository. The reference model may for instance be a reference ontology which is stored in a process knowledge warehouse. The reference model may comprise meta information which semantically describes the vocabulary used for the textual annotation of elements of at least one process model. By comparing process elements, as being provided in step 200 and reference model elements, as being provided in step 201 one can establish a linkage between at least one process element and at least one reference model element. As in step 202 a linkage is provided, which connects at least one process model with at least one reference model, a semantic annotation of at least one process model is provided.

As a function of the provided linkage elementary process patterns of the at least one process model are extracted in a subsequent step 203. The extraction of elementary process patterns in a sub-sequent step 203 may comprise further substeps, such as reasoning over the reference model as being provided in step 201 to identify process goals and associated pattern solutions.

In a further subsequent step 204 the extracted elementary process patterns are arranged in a process goal tree. It may be of advantage to perform the steps 203 and 204 iteratively on the plurality of stored process models to identify all elementary process patterns being comprised in the stored process models and creating one process goal tree for each of the process models being comprised in the plurality of stored process models.

In a subsequent step 205 the extracted process goals of each elementary process pattern of each of the process models are compared. Hence similar process goals can be identified in each of the process models. Comparing the process goals may for instance be accomplished by comparing each of the process goal trees with each other. The reference model as being provided in step 201 can provide a hint, which indicates if two process goals are similar. Hence parts of the provided process models are identified which frequently occur in a variety of process models. If these parts relate to leaf nodes of the goal trees they constitute elementary process patterns; if these parts relate to inner nodes they constitute composite process patterns. Such a composite pattern is composed by the elementary process patterns that relate to subgoals of the goals the composite pattern relates to.

For considering the parts of the provided process models as common modelling patterns a threshold is required, which indicates a minimum number of occurrence of the parts of the provided process models in the plurality of stored process models. It may be the case, that in five process models a certain pattern appears and therefore the pattern is considered as a common modelling pattern. Hence, a common modelling pattern is a set of process patterns, which appears to at least a certain number in a given set of process models. For determining whether a set of process patterns forms a common modelling pattern a threshold of appearance of the set of process goals as part of each process pattern is provided in step 206. The provision of the threshold in step 206 may also be accomplished as a function of the number of stored process models. Hence a relative number of occurrence of the process goals can be specified.

In a subsequent step 207 the common modelling pattern is provided as a function of the threshold as being defined in step 206. Step 207 may comprise further substeps such as formatting the generated common modelling pattern into a specific format and/or meta model.

In a further optional subsequent step 208 the common modelling patterns as being provided in step 207 are evaluated as regards the presence of a best practice solution. Hence, in step 208 the output common modelling patterns are analysed and in case one common modelling pattern holds certain characteristics it can be considered as representing a best practice solution. The characteristics may be present in case a common modelling pattern provides a minimum of effort for reaching at least one process goal. The person skilled in the art appreciate further characteristics and/or metrics according to which a common modelling pattern represents a best practice solution.

The afore-mentioned steps are performed iteratively.

Figure 3:
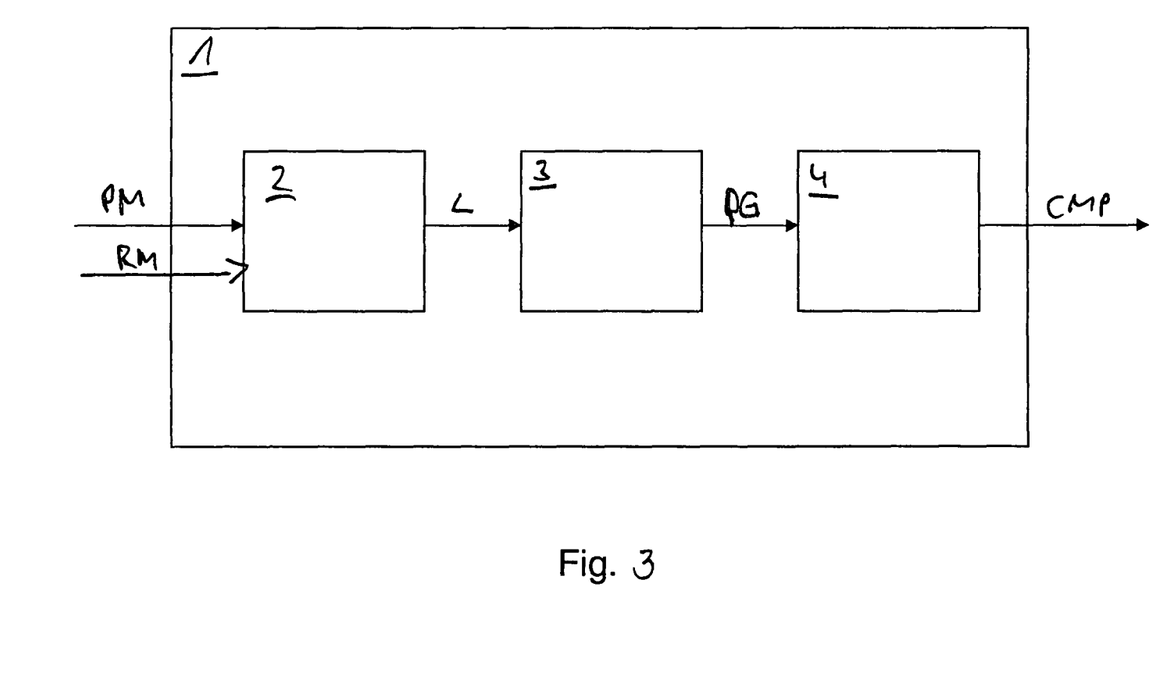
FIG. 3 shows a block diagram of an apparatus for automatic provision of a common modelling pattern according to an aspect of an embodiment of the present invention.

FIG. 3 shows a block diagram of an apparatus 1 for automatic provision of a common modelling pattern CMP from a plurality of stored process models PM. The apparatus 1 comprises:

A first device/module 2 for establishing at least one linkage L between at least one process element of the plurality of process models PM and at least one reference model element of a reference model RM being stored in a storage device.

The apparatus 1 further comprises a second device/module 3 for extracting at least one process pattern from the plurality of process models PM as a function of the established at least one linkage L.

The apparatus 1 further comprises a third device/module 4 for identifying at least one process pattern being comprised in at least a predetermined number of process models PM for provision of the common modelling pattern CMP.

Figure 4:
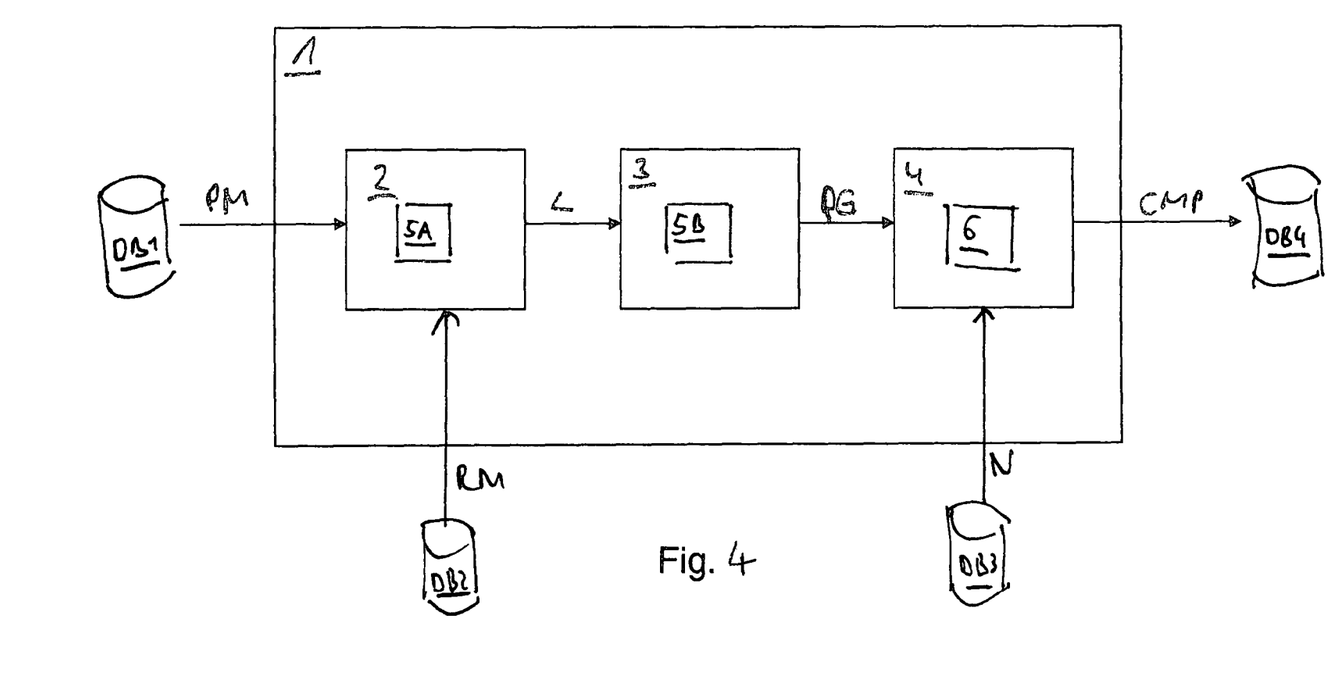
FIG. 4 shows a detailed block diagram of an apparatus for automatic provision of a common modelling pattern according to an aspect of an embodiment of the present invention.

FIG. 4 shows a detailed block diagram of an apparatus 1 for automatic provision of a common modelling pattern and differs from the embodiment of apparatus 1 as shown in FIG. 3 as follows.

In the present embodiment of the apparatus 1 the process model PM is provided by a model repository providing several process models PM in the EPC format. The model repository is stored in a database DB1. Furthermore, the reference model is provided by a process knowledge warehouse being stored in a further database DB2. It may be of advantage to store and maintain both the process models PM as well as the reference models RM in a single database management system.

The first device/module 2 for establishing at least one linkage L furthermore comprises a linguistic analysis device 5A. The linguistic analysis device 5A is arranged to compare process elements from the stored process models PM with reference model elements from the reference model RM and therefore identify matching elements of both models. As a function of the linguistic analysis the linkage L can be provided.

A further linguistic analysis device 5B can be comprised in the second device/module 3 for extracting at least one process goal PG and its associated process solution to form a process pattern. The linguistic analysis device 5B is arranged to analyse the reference model RM as regards the presence of a process pattern. The process goal of a process pattern is transmitted to the third device/module 4 for identifying at least one process goal PG being comprised in at least a predetermined number N of process models.

The predetermined number N can be provided by the further database DB3 or can also be calculated by a threshold calculation device 6. The threshold calculation device 6 is arranged to calculate a specific number N, the number N indicating a threshold above which extracted process patterns can be considered as forming a common modelling pattern CMP.

The calculated common modelling pattern CMP is transmitted to a further database DB4 which for instance furthermore communicates with a process knowledge warehouse.

The apparatus 1 as well as the first device/module 2 for establishing at least one linkage L, the second device/module 3 for extracting and at least one process pattern, the third device/module 4 for identifying at least one process pattern, the linguistic analysis devices 5A, 5B as well as the threshold calculation device 6 can be formed by a processor, a microprocessor, a computer, a computer system, a central processing unit, an arithmetic calculation unit and/or a circuit.

The introduced databases, especially the databases DB1, DB2, DB3 and DB4 may be formed by any kind of storage device, for instance a hard disk, a flash disk, a USB stick, a floppy disk, a disk, a CD, a DVD, a bluray disk, a band and/or a removable storage medium.

Figure 5:
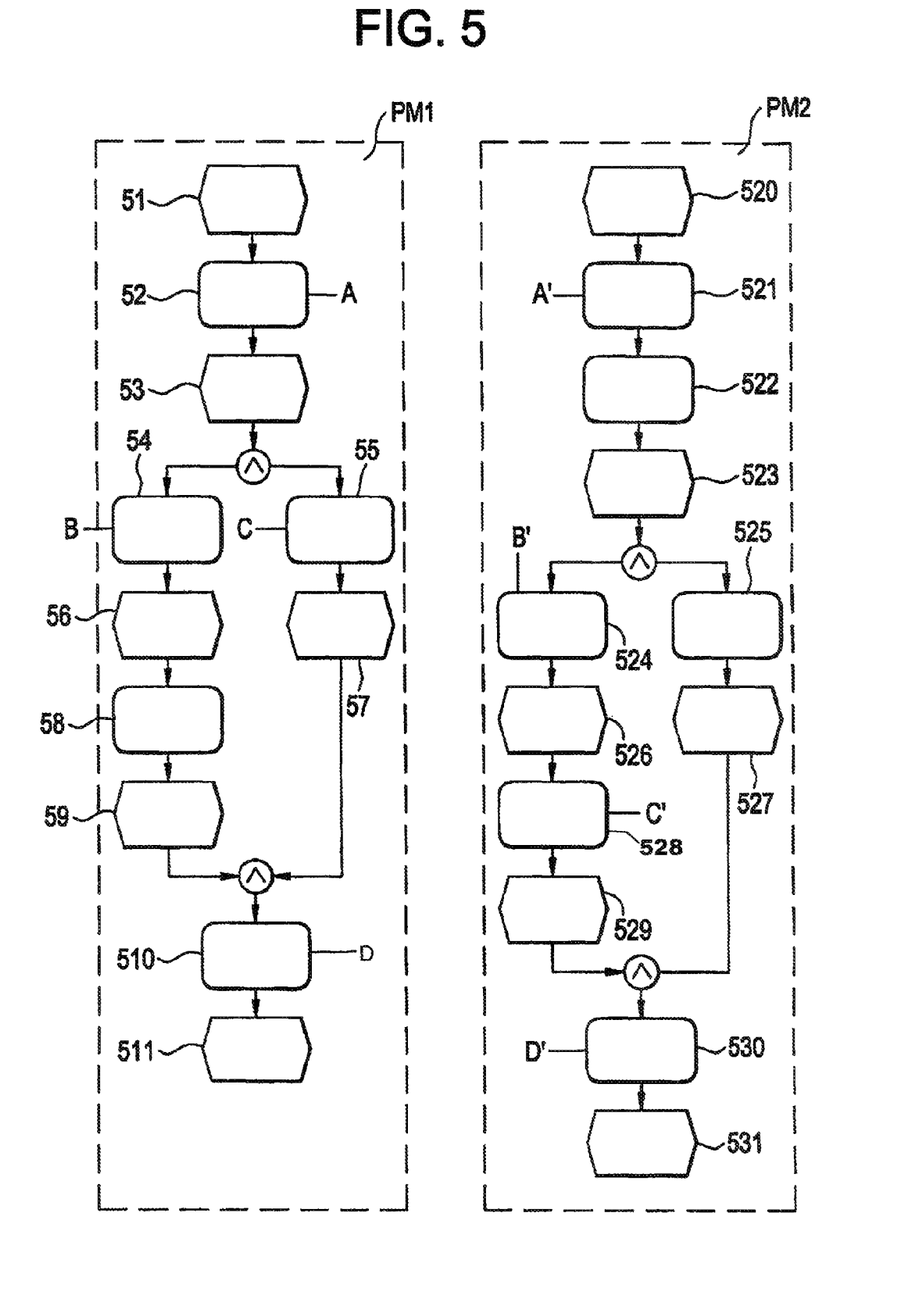
FIG. 5 shows two process models as being used by a method for automatically providing a common modelling pattern according to an aspect of an embodiment of the present invention.

FIG. 5 shows two process models PM1, PM2 each describing one engineering process from the domain of software development and from the domain of hardware development. In the first process model PM1 a software development project is described. Most process models PM1, PM2 are modelled according to the EPC approach. Hence the engineering process starts with a first event 51 "software project authorized" in the process model PM1. Furthermore, the process model PM2 starts an event 520 "hardware project authorized". Each of the process models PM1, PM2 comprises one final goal, which is denoted by the node 511, 531, respectively.

The arcs of each of the process models PM1, PM2 describe a control flow between process elements. Hence each process element is logically and/or temporarily put into relation with at least one further process element.

For a more intuitive understanding of the present FIG. 5 an overview of the process elements is provided in the following:

| Process Elements of Process Model PM1 | |
|---|---|
| 51 | Software Project Authorized |
| 52 | Specify Requirements for Software |
| 53 | Requirements Specified for Software |
| 54 | Estimate Development Costs for Software |
| 55 | Design Architecture for Software |
| 56 | Development Costs for Software Estimated |
| 57 | Architecture for Software Designed |
| 58 | Define Software Project Goal |
| 59 | Software Project Goal Defined |
| 510 | Define SW Development Plan |
| 511 | Software Development Project Planned |

Furthermore the process elements as being comprised in process model PM2 are denoted as follows:

| Process Elements of Process Model PM2 | |
|---|---|
| 520 | Hardware Project Authorized |
| 521 | Identify And Analyze Requirements for Hardware |
| 522 | Define Quality Goals for Hardware Components |
| 523 | Requirements Specified for Hardware |
| 524 | Estimate HW Manufacturing Costs |
| 525 | Plan Qualify Measures |
| 526 | Manufacturing Costs for Hardware Estimated |
| 527 | Qualify Measures Planned |
| 528 | Design Architecture for Hardware |
| 529 | Architecture for Hardware Designed |
| 530 | Define Development Plan for Hardware |
| 531 | Hardware Development Project Planned |

In the present embodiment of a method for automatically providing a common modelling pattern according to the invention each of the process elements 51, 52, 53, . . . , 511 as described in the process model PM1 are analysed for extracting process patterns. The analysis comprises a comparison of the process model PM1 with a provided reference model RM. In the present embodiment the reference model RM is formed by a reference ontology. To enable a machine interpretable model of the EPC functions/events as provided by the process model PM1 each process element 51, 52, 53, . . . , 511 is annotated by establishing a semantic linkage to the reference ontology. The reference ontology contains standardized terms and destinations of concepts and relations that capture the meaning of lexical terms used for a natural language description of EPC functions and events as provided by process model PM1. Output of this procedure is a semantically annotated EPC model and a populated reference ontology.

Instances of the references ontology concepts can be defined by their name, for instance the name "software requirements" is an instance of the ontology concept "process object" or by a unique identifier, for instance OID=1. The texture counterpart or lexical representation not necessarily equals the concept instance name. A concept instance may have several lexical representations, for instance "requirements for software" is a textual representation of the knowledge base entry "software requirements". This can result from implicit semantics imposed by the subjection of process modelers, especially when using different multi-word expressions for the same concept instance name or by using abbreviations or synonyms.

It may be the case, that "identify and analyse software requirements with customer for project specification" is a lexical structure used for naming an EPC function. The same meaning can also be expressed by their lexical structure "specify and analyse as the requirements for project specification with customer" by using synonyms, for instance suppose the verbs "identify" and "specify" a used synonymously. Despite an alternative sequence of words, the meaning remains the same.

For solving the problem, that process elements and reference model elements are not exactly the same. The lexical knowledge is separated from process knowledge in the reference model and/or in the reference ontology. Textual counterparts of process ontology instances are mapped to lexical concept instances. Hence a linkage between at least one process element 51, 52, 53, . . . 511 of the plurality of process models PM1, PM2 and at least one reference model element of a stored reference model is established.

In further steps one can identify a plurality of elementary process patterns, which are in the present FIG. 5 denoted by the reference signs A, B, C and D. Hence, in the present embodiment of the invention four elementary process patterns A, B, C, D are extracted from the process model PM1. The extraction of the plurality of elementary process patterns A, B, C, D may require further substeps such as extracting the phrase "define SW development plan" towards the element "define development plan" of the reference ontology.

In an analogue procedure further elementary process patterns A', B', C' and D' are extracted from the second process model PM2. It is determined, that the process elements 521, 524, 528 and 530 denote one elementary process pattern A', B', C' and D'.

Hence, two sets of elementary process patterns are derived from the process models PM1 and PM2. By abstracting each of the process goals associated with the elementary patterns A, B, C, D as well as A', B', C', D' it can be identified, that both sets of process goals occur in each of the process models PM1, PM2. Therefore the identified elementary process patterns form a common modelling pattern, as they appear twice in two process models PM1 and PM2.

Figure 6:
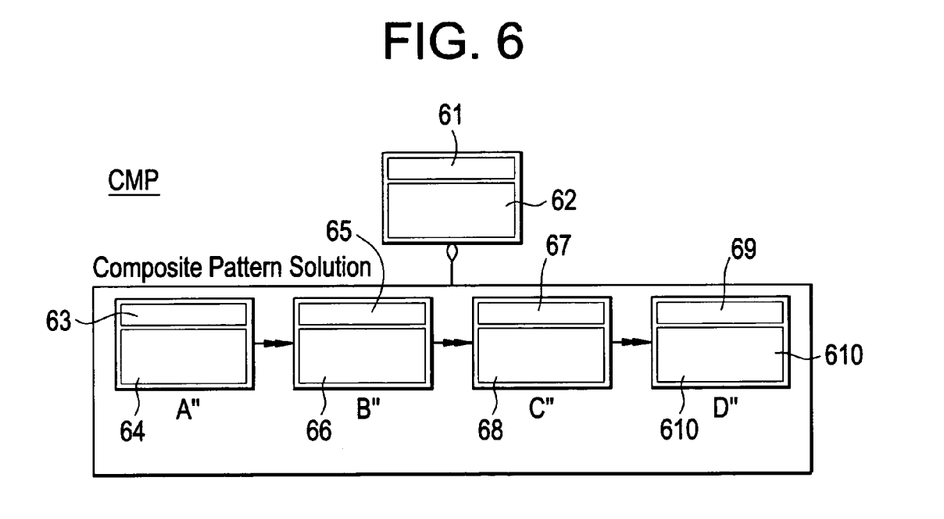
FIG. 6 shows a common modelling pattern diagram as being provided by a method for automatically providing a common modelling pattern according to an aspect of an embodiment of the present invention.

FIG. 6 shows the arrangement of the elementary process patterns A, B, C, D as being defined in FIG. 5 as a common modelling pattern CMP.

In the following the reference signs denoting the process elements of the common modelling pattern CMP are described:

| Process elements of the common modelling pattern | |
|---|---|
| 61 | Plan |
| 62 | Development Project |
| 63 | Specify |
| 64 | Requirements |

| Process elements of the common modelling pattern | |
|---|---|
| 65 | Estimate |
| 66 | Costs |
| 67 | Design |
| 68 | Architecture |
| 69 | Define |
| 610 | Development Plan |

In the present embodiment of the invention the process goal of the elementary pattern A as being identified in process model PM1 as well as the process goal of elementary pattern A' as being defined in the process model PM2 have been abstracted towards the process goal of elementary pattern A" as being denoted in the present FIG. 6. Accordingly the process goals of the elementary patterns B", C" and D" have been extracted from the process goals of the elementary patterns B, C, D from process model PM1 as well as B', C', D' from process model PM2.

Furthermore the control flow relations, also referred to as arcs, as modelled in both process models PM1, PM2 have been considered in constructing the common modelling pattern CMP. Hence the elementary process patterns A", B", C", D" have been arranged in temporal order. Hence a common modelling pattern CMP is provided as a function of a plurality of stored process models PM1, PM2.

Figure 7:
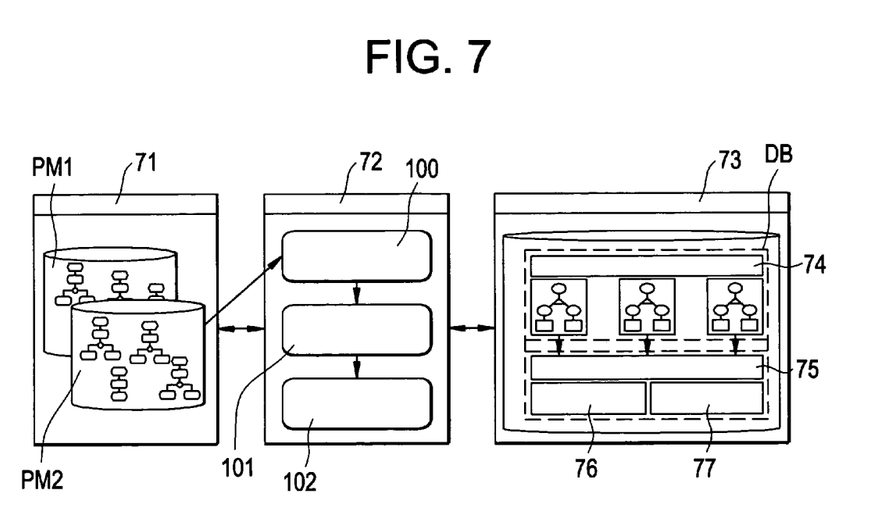
FIG. 7 shows a further detailed flow diagram of a method for automatically providing a common modelling pattern according to an aspect of an embodiment of the present invention.

FIG. 7 shows a schematic overview of a method for automatic providing a common modelling pattern CMP according to an aspect of the present invention.

In the present embodiment the reference signs denote the following semantics:

| Reference signs of FIG. 7 | |
|---|---|
| 71 | Model Repositories |
| 72 | Stages |
| 73 | Process Knowledge Warehouse |
| 74 | Process Patterns |
| 75 | Reference Ontology |
| 76 | Lexical Knowledge Base |
| 77 | Process Knowledge Base |
| 100 | Semantic Annotation |
| 101 | Extraction of Pattern-Based Description |
| 102 | Composite Process Pattern Mining |
| PM1 | Process Model 1 |
| PM2 | Process Model 2 |

In the present embodiment of the invention the two process models PM1, PM2 are stored in a model repository 71. The process models PM1, PM2 serve as input for accomplishing the method steps 100, 101 and 102. The method steps 100, 101 and 102 can be summarized as an approach for automated detection of the common modelling practices being comprised of several stages 72. The terminology "common modelling practices" can alternatively be used for "common model patterns" CMP.

In the present embodiment of the invention the detected common modelling practices are transmitted to a process knowledge warehouse 73. The process knowledge warehouse 73 comprises a database which stores each of the identified process patterns, arranged in the form of a process goal tree for each common modelling pattern, along with the reference ontology 75 as well as a lexical knowledge base 76 and a process knowledge base 77. The reference ontology 75 and the lexical knowledge base 76 can be arranged to provide the reference model RM. Furthermore the process knowledge base 77 may provide the first and the second process model PM1, PM2.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for automatically providing a common modelling pattern from a plurality of stored process models, the method comprising:

establishing at least one linkage between at least one process element of the plurality of process models and at least one reference model element of a reference model stored in a storage device by performing a linguistic analysis of the at least one process element and the at least one reference model element;

extracting a plurality of elementary process patterns comprising at least a process goal associated with a process solution from the plurality of process models and constructing a process goal tree which organizes dependencies between process goals of elementary process patterns; and detecting a number of elementary process patterns of the plurality of elementary process patterns being comprised in at least a number of the process models for providing the common modelling pattern, the common modelling pattern being a set of the plurality elementary process patterns which occur more than a threshold number of times in the process models and being based on at least one control flow between the detected elementary process patterns in the number of process models.

2. The method according to claim 1, wherein the stored reference model is formed by at least an ontology comprising a lexical knowledge base and a process knowledge base, each expressed by formal or semi-formal models.

3. The method according to claim 2, wherein each process model is represented by at least one of a group of representations, the group comprising: a graph based or graphical representation or text based representation.

4. The method according to claim 3, wherein each process model comprises a plurality of process patterns comprising process goals and process activities.

5. The method according to claim 4, wherein each process pattern is formed by at least one of a group of concepts, the group comprising: an identifier, a process element of at least one of the plurality of process models, a state of the process element and a constraint indicating a precondition with reference to the process element, a task with reference to the process element to form a process activity.

6. The method according to claim 5, wherein the process elements are labeled by text phrases each comprising at least one term.

7. The method according to claim 6, wherein the terms are classified according to a natural language grammar into different word types comprising nouns, verbs, articles, conjunctions, prepositions and adjectives.

8. The method according to claim 7, wherein stop words of stop word types are filtered from the terms.

9. The method according to claim 8, wherein the stop word types comprise prepositions, articles and conjunctions.

10. The method according to claim 9, wherein extracting at least one process pattern comprises an analysis of the reference model.

11. The method according to claim 10, wherein the reference model provides a hint for extracting at least one process goal.

12. The method according to claim 3, wherein the graph based or graphical representation or text based representation include at least one of a xml based representation, an EPC based representation, a BPMN based representation, a UML based representation and a Petri-net based representation.

13. A non-transitory computer readable medium including program segments for, when executed on a computer device, causing the computer device to implement the method of claim 1.

14. The method according to claim 1, further comprising:
performing an analysis of the goal tree and its associated elementary process patterns to detect composite process patterns.

15. The method of claim 1, wherein the at least one process element and the at least one reference model element are different, the at least one process element representing a textual counterpart of a process ontology instance and the at least one reference model element representing a lexical concept instance.

16. An apparatus for automatic provision of a common modelling pattern from a plurality of stored process models, comprising:

a processor configured to,
establish at least one linkage between at least one process element of the plurality of process models and at least one reference model element of a reference model being stored in a storage device by performing a linguistic analysis of the at least one process element and the at least one reference model element;
extract a plurality of elementary process patterns comprising at least a process goal associated with a process solution from the plurality of process models and constructing a process goal tree which organizes dependencies between process goals of elementary process patterns; and
detect a number of the elementary process patterns of the plurality of elementary process patterns being comprised in at least a number of the process models for providing the common modelling pattern, the common modelling pattern being a set of the plurality elementary process patterns which occur more than a threshold number of times in the process models and being based on at least one control flow between the detected elementary process patterns in the number of process models.

17. The apparatus as claimed in claim 16, wherein the processor is configured to analyze the goal tree and its associated elementary process patterns to detect composite process patterns.

18. The apparatus as claimed in claim 16, wherein the at least one process element and the at least one reference model element are different, the at least one process element representing a textual counterpart of a process ontology instance and the at least one reference model element representing a lexical concept instance.

* * * * *